(12) United States Patent
Moffett

(10) Patent No.: US 9,789,457 B2
(45) Date of Patent: Oct. 17, 2017

(54) TREATMENT OF TAILING STREAMS

(71) Applicant: THE CHEMOURS COMPANY FC LLC, Wilmington, DE (US)

(72) Inventor: Robert Harvey Moffett, Landenberg, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 47 days.

(21) Appl. No.: 14/777,608

(22) PCT Filed: Mar. 20, 2014

(86) PCT No.: PCT/US2014/031272
§ 371 (c)(1),
(2) Date: Sep. 16, 2015

(87) PCT Pub. No.: WO2014/153431
PCT Pub. Date: Sep. 25, 2014

(65) Prior Publication Data
US 2016/0272525 A1    Sep. 22, 2016

Related U.S. Application Data

(60) Provisional application No. 61/804,263, filed on Mar. 22, 2013.

(51) Int. Cl.
| | | |
|---|---|---|
| *E02D 3/00* | (2006.01) | |
| *B01J 13/00* | (2006.01) | |
| *E02D 3/12* | (2006.01) | |
| *C04B 28/24* | (2006.01) | |
| *C04B 28/26* | (2006.01) | |
| *C10G 1/04* | (2006.01) | |
| *C02F 11/12* | (2006.01) | |
| *C04B 24/26* | (2006.01) | |
| *C04B 111/00* | (2006.01) | |
| *C02F 103/10* | (2006.01) | |

(52) U.S. Cl.
CPC ......... *B01J 13/0056* (2013.01); *C02F 11/121* (2013.01); *C04B 24/2652* (2013.01); *C04B 28/24* (2013.01); *C04B 28/26* (2013.01); *C10G 1/045* (2013.01); *E02D 3/12* (2013.01); *C02F 2103/10* (2013.01); *C04B 2111/00767* (2013.01); *Y02W 30/91* (2015.05); *Y02W 30/93* (2015.05)

(58) Field of Classification Search
CPC .................................. E02D 3/12; B01J 13/005
See application file for complete search history.

(56) References Cited

U.S. PATENT DOCUMENTS

| | | |
|---|---|---|
| 2,244,324 A | 6/1941 | Bird |
| 3,202,214 A | 8/1965 | Mclaughlin |
| 3,668,088 A | 6/1972 | Iler |
| 4,927,498 A | 5/1990 | Rushmere |
| 4,954,220 A | 9/1990 | Rushmere |
| 5,127,994 A | 7/1992 | Johansson |
| 5,470,435 A | 11/1995 | Rushmere et al. |
| 5,482,693 A | 1/1996 | Rushmere et al. |
| 5,492,628 A | 2/1996 | Schutte |
| 5,543,014 A | 8/1996 | Rushmere et al. |
| 5,626,721 A | 5/1997 | Rushmere et al. |
| 8,815,004 B2 | 8/2014 | Moffett et al. |
| 2010/0104744 A1* | 4/2010 | Moffett .................. C04B 28/24 427/138 |
| 2012/0318170 A1 | 12/2012 | Moffett et al. |

FOREIGN PATENT DOCUMENTS

| | | |
|---|---|---|
| EP | 0491879 B1 | 6/1994 |
| EP | 0502089 B1 | 8/1998 |
| JP | 2002079527 | 3/2002 |
| JP | 2002220220 | 8/2002 |
| JP | 2003236345 | 8/2003 |
| JP | 2003311130 | 11/2003 |
| JP | 2004323326 | 11/2004 |
| JP | 2007000803 | 1/2007 |
| WO | 03033618 A1 | 4/2003 |

OTHER PUBLICATIONS 174-176 and 225-234 of "The Chemistry of Silica" by Ralph K. Iler, published by John Wiley and Sons, N. Y., 1979.
International Search Report, PCT/US2014/031272, Mailed Jul. 14, 2014.

* cited by examiner

*Primary Examiner* — John Kreck

(57) ABSTRACT

A process for treating a tailings stream comprising water, solids, and optionally polyacrylamide. The process involves (a) contacting the tailings stream with a silicate source for a pre-determined period of time to form a mixture; b) after a pre-determined period of time of at least 5 minutes, contacting the mixture with an activator to initiate gel formation, wherein the gel entraps the solids within the gel; and c) allowing the gel to strengthen and solidify; wherein the gel formation is delayed compared with a non-delayed process.

18 Claims, No Drawings

TREATMENT OF TAILING STREAMS

BACKGROUND

Field of the Disclosure

The present disclosure relates to a process to treat tailings streams produced in mining operations to provide a deposit utilizing delayed gelation.

Description of Related Art

Tailings, as a general term, refers to byproducts from mining operations and processing of mined materials in which a valuable material such as a metal, mineral, coal, and the like, is separated, for example, extracted, from a mined material, that is, material which has been removed from the earth. Tailings typically comprise clay and optionally sand and/or rock. Tailings further comprise water. Water is used in combination with mechanical and/or chemical processes for removing the valuable material from the mined material. Mining operations include those for precious metals, base metals, ores, clays and coal. In addition, mining operations include recovery of bitumen from oil sands.

Tailings treatment and disposal are major issues for mining operations. Water recovery from the tailings for re-use in extraction processes and transportation is often desired. Tailings solids, such as clay and sand, as well as other solid materials such as rock are generally sent to a storage facility or disposal area local to the mining operation. Management of such storage facilities or disposal areas is an enormous task.

Storage or disposal of tailings involves construction of a facility that is safe for storage (including permanent storage), sufficiently large and stable to contain the tailings within the facility, and protecting the local environment. It may be desirable to access water from the tailings storage facility for use in mining operations such as extracting and other treatments.

Various tailings streams are produced in extraction processes. A tailings stream is an aqueous stream (slurry, suspension) containing components requiring further treatment, which may include extraction of valuable material or solids removal and/or purification to enable recycle of the water content of the tailings stream. Some tailings streams will be deposited in a tailings pond for long periods of time, including permanently. Coarse solids may settle quickly. The top layer of the pond may clarify with time to make water that is suitable for re-use in the extraction process. A layer may comprise water and fine solids, which solids settle very slowly. This layer may ultimately become mature fine tailings (MFT).

MFT is a stable composite slurry comprising one or more of clay, sand, silt, water and optionally rock. MFT has little strength, no vegetative potential and may be toxic to animal life, so it must be confined and prevented from contaminating water supplies. Typically, several years of settling time are required to make MFT, which may have little additional settling or consolidation occurring for decades.

MFT ponds pose an environmental concern. For example, the Energy Resources Conservation Board of Alberta (ERCB) has issued Directive 074, which mandates a reduction of MFT ponds and the formation of trafficable deposits for MFT produced in mining and extraction of bitumen from oil sands by all oil sands operators.

Moffett disclosed, in US 2010/0104744 A1, a process to treat tailings streams with a silicate source and an activator. The silicate source is an alkali metal silicate, polysilicate microgel, or combinations thereof. The activator may be an acid, alkaline earth metal salt, aluminum salt, organic ester, dialdehyde, organic carbonate, organic phosphate, amide, or a combination thereof.

Alkali metal silicate solutions are distinct from colloidal silica sols by their ratio of silica to metal oxide ($SiO_2:M_2O$). For example, solutions of sodium silicate have $SiO_2:Na_2O$ of less than 4:1, as disclosed by Iler, "The Chemistry of Silica", Wiley Interscience (1979), page 116. Iler further recited that "silicate solutions of higher ratios were not available."

Moffett disclosed in U.S. patent application Ser. No. 13/329,375, filed Dec. 19, 2011, a process to treat tailings streams with a gelling agent and an activator. The gelling agent is selected from the group consisting of colloidal silica, aluminum-modified colloidal silica, de-ionized colloidal silica, polysiloxane, siliconate, acrylamide, acrylate, urethane, phenoplast, aminoplast, vinyl ester-styrene, polyester-styrene, furfuryl alcohol-based furol polymer, epoxy, vulcanized oil, lignin, lignosulfonate, lignosulfite, montan wax, polyvinyl pyrrolidone, and combinations of two or more thereof. The activator can be any compound or mixture of compounds that will initiate gelation.

An important aspect of tailings management is consolidation of the tailings solids—that is, to reduce the water content of the deposited tailings, for example to minimize storage space required upon disposal.

Placement of the treated tailings on a sloped surface is one preferred deposition technique. Ideally, the treated tailings are deposited on the highest point or a sloped deposition field and allowed to traverse the sloped field and gel on the same slope as the field. It is desired that the gel formation occur slowly as the deposit flows down the hill to avoid a large build-up of the treated solids at the top or the first section of the slope. Previous attempts to alter gel formation delay times include decreasing the concentration of the silicate source, decreasing the concentration of the activator, or the use of an ester as an activator. While these methods are somewhat effective, the dewatering and strengths of the tailings can also be affected. While there have been many advances in the treatment of tailings, there remains a need to improve one or more of de-watering (less water in the tailings), consolidation (reduction of volume of the tailings), and strengthening of the tailings using a delayed gelation process. The present invention meets these needs.

BRIEF SUMMARY OF THE DISCLOSURE

The present disclosure provides a process for treating a tailings stream comprising water, solids, and optionally polyacrylamide. The tailings treatment process comprises: (a) contacting the tailings stream with a silicate source for a pre-determined period of time to form a mixture; b) after the pre-determined period of time, contacting the mixture with an activator to initiate gel formation, wherein the gel entraps the solids within the gel; and c) allowing the gel to strengthen and solidify; wherein the gel formation is delayed compared with a non-delayed process.

DETAILED DESCRIPTION

The foregoing general description and the following detailed description are exemplary and explanatory only and are not restrictive of the invention, as defined in the appended claims. Other features and benefits of any one or more of the embodiments will be apparent from the following detailed description, and from the claims.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Before addressing details of embodiments described below, some terms are defined or clarified.

Definitions

Certain terms as used herein have the definitions as provided below.

Clay is any naturally occurring material composed primarily of hydrous aluminum silicates. Clay may be a mixture of clay minerals and small amounts of nonclay materials or it may be predominantly one clay mineral. The type is determined by the predominant clay mineral.

The term coarse particle refers to a single particle or a collection of particles. It will be appreciated by those skilled in the art that that coarse particle size may vary depending on the source of the tailings stream. For example, in oil sands tailings, coarse particles are defined as particles larger than 44 µm. Alternatively, in coal mine tailings, coarse particles are defined as particles larger than 2.5 µm.

Entrap solids means the solid particles, such as clay, sand, silt, and rock (if present), are trapped within the gel structure while the water is not permanently retained within the structure.

The term fine particle refers to a single particle or a collection of particles. It will be appreciated by those skilled in the art that that fine particle size may vary depending on the source of the tailings stream. For example, in oil sands tailings, fine particles are defined as particles smaller than 44 µm. Alternatively, in coal mine tailings, fine particles are defined as particles smaller than 2.5 µm.

Mineral is a naturally occurring inorganic element or compound having an orderly internal structure and characteristic chemical composition, crystal form, and physical properties.

Rock is any consolidated or coherent and relatively hard, naturally formed mass of mineral matter; stone, with the majority consisting of two or more minerals.

Sand is an unconsolidated or moderately consolidated sedimentary deposit, most commonly composed of quartz (silica), but may include particles of any mineral composition or mixture of rock or minerals, such as coral sand, which consists of limestone (calcium carbonate). (Source: AGI American Geosciences Institute)

Silt is a mixture of fine particulate rock and/or mineral.

The term "the gel formation is delayed", as used herein, means the gel formation does not occur instantaneously at the time of the silicate source addition in step (a). It also means that starting from the moment the activator is added to or contacted with the mixture in step (b), the rate of increase in yield stress of the treated tailings stream is substantially reduced compared with a non-delayed process when other conditions of the processes are substantially the same.

The term "treated tailings" or "treated tailings stream", as used herein, means the resulting tailings stream mixture after steps (a) and (b). It comprises tailings stream, silicate source, activator, formed gel, optionally reinforcing agent, and optionally polyacrylamide.

The term "non-delayed process", as used herein, means a process wherein the silicate source and the activator are added into or contacted with a tailings stream simultaneously or near-simultaneously.

The delaying of the gel formation allows for the treated tailings stream to flow longer when spread over a surface. This is important for when the treated tailings need to flow over a longer distance prior to gelling. Under normal non-delayed process, the gelling is controlled by the silicate source strength, activators, pH adjustments, etc. Surprisingly, the present disclosure provides a process wherein the gel formation is delayed after activator addition.

The present disclosure provides a process for treating a tailings stream comprising, consisting essentially of, or consisting of water, solids, and optionally polyacrylamide. The tailings treatment process comprises: (a) contacting the tailings stream with a silicate source for a pre-determined period of time to form a mixture; b) after the pre-determined period of time, contacting the mixture with an activator to initiate gel formation, wherein the gel entraps the solids within the gel; and c) allowing the gel to strengthen and solidify; wherein the gel formation is delayed compared with a non-delayed process.

In some embodiments of this invention, the tailings treatment process further comprises adding a polyacrylamide (PAM) to the tailings stream or the mixture prior to step (c). Polyacrylamide can be added to the tailings stream before, after, or at about the same time a silicate source is added. Typically, polyacrylamide is added to the mixture before or at about the same time an activator is added, but can also be added after the addition of an activator and before the mixture is substantially gelled.

When used, the polyacrylamide is added to the tailings stream or the mixture in an amount of 50-10,000 grams PAM/1000 kg of fine particles (particles smaller than 44 µm).

In some embodiments of this invention, the tailings treatment process further comprises adding a reinforcing agent to the tailings stream or the mixture prior to step (c). In some embodiments of this invention, the tailings treatment process further comprises adding a reinforcing agent in step (a).

The reinforcing agent can be added to the tailings stream, to the silicate source, to the mixture, to the activator, to the mixture and activator, or to the gel formed in step (b). The reinforcing agent can be added to any of the above components up and until the gel strengthens and solidifies.

When used, a reinforcing agent is added in an amount equal to 0.1 to 700 kg/tonne based on the total weight of the tailings stream. Preferably the reinforcing agent is added in an amount equal to 0.1 to 100 kg/tonne based on the total weight of the tailings stream. More preferably the reinforcing agent is added in an amount equal to 0.1 to 10 kg/tonne based on the total weight of the tailings stream.

The present invention is useful for treating tailings streams and particularly useful for treatment of tailings stream produced in processes to extract bitumen from oil sands ores. Oil sands ores are large deposits of naturally occurring mixtures comprising bitumen, sand, clays, and other inorganic materials, such as titanium or zirconium ores. Herein, bitumen refers to hydrocarbons and other oils found in oil sands, tar sands, crude oil and other petroleum sources. The oil sands ores typically comprise about 2 to 18 wt % bitumen, based on the total weight of the oil sands ore. Oil sand ores containing greater than 6 to 7 wt % bitumen, based on the total weight of the ore, are mined commercially today. The oil sands ores further comprise water, sand and clay. Generally the oil sands ores comprise about 2 to 5 wt % water.

Tailings Stream

Tailings stream is an aqueous fluid (slurry, suspension) comprising, consisting essentially of, or consisting of water and solids. In some embodiments of this invention, the tailings stream comprises, consists essentially of, or consists of water, solids, and polyacrylamide. In some embodiments of this invention, the polyacrylamide is from a tailings treatment process. For example, fresh tailings can be thickened with a polyacrylamide. In some embodiments of this invention, the tailings stream comprises, consists essentially of, or consists of water, solids, and polysilicate microgel. In some embodiments of this invention, the polysilicate microgel is from the oil sands bitumen recovery process. In some embodiments of this invention, the tailings stream comprises, consists essentially of, or consists of water, solids, polyacrylamide, and polysilicate microgel.

In some embodiments of this invention, the tailings stream solids comprise clay, sand, rock, silt, or any combinations thereof. Solids may further comprise unextracted particles of mineral in the mined material. A portion or all of the solids in the tailings stream may be suspended in the water. The suspended solids are typically not easy to be separated from the water.

The solids have a particle size typically less than 0.5 mm, and in some embodiments less than 0.05 mm. The tailings stream typically comprises at least 5% by weight solids, in some embodiments greater than 10%, and in some other embodiments greater than 20% by weight solids, based on the total weight of the tailings stream. The rest parts of the tailings stream are typically water and/or dissolved materials such as salts and processing aids (e.g., organic solvent, extraction aids such as polysilicate microgel, and polyacrylamide). The tailings stream may comprise less than 70% solids, or less than 50% solids, or less than 40% solids, based on the total weight of the tailings.

For a particular application, oil sands tailings streams may comprise solids wherein 10% to 100% by volume of the solids have a particle size of less than 0.5 mm, in some embodiments, 20% by volume to 100% by volume of the solids have a particle size less than 0.5 mm, based on the total volume of the solids. In some embodiments of this invention, oil sands tailings streams may comprise solids wherein 5% to 100% by volume of the solids have a particle size of less than 0.05 mm, and in some embodiments, 20% by volume to 100% by volume of the solids have a particle size less than 0.05 mm, based on the total volume of the solids.

Tailings stream solids from mining and mineral processing operations have varied size distributions. Most tailings stream solids comprise a high percent of fine particles. For example, most tailings stream solids produced from mining and processing of copper, gold, iron, lead, zinc, molybdenum and taconite have 50% by weight or more of the particles passing a 0.075 mm (No. 200) sieve. Tailings stream solids from iron ore mining and mineral processing may have a slighter larger particle size. For properties of a number of tailings, see, for example http://www.rmrc.unh.edu/tools/uguidelines/mwst1.asp, accessed Jun. 21, 2012.

The tailings stream is typically produced from a mining operation or mineral processing plant. In some embodiments of this invention, the tailings stream is produced in a process to extract bitumen from oil sands ores. In a mining operation a material is removed from the earth. In a mineral processing plant, such material is treated to extract a valuable mineral such as coal, oil (such as from oil sands), precious metal ore, base metal ore, clay, gemstone. Mined materials include, for example, coal, uranium, potash, clay, phosphate, gypsum, precious metals and base metals. The generated tailings stream may comprise valuable mineral content (e.g., bitumen, coal, precious or base metal, gemstone) as part of the solids. Thus, there may be steps in advance of entrapping the solids (herein, step (a)) to remove the valuable mineral content. Essentially any mining or mineral processing operation that uses water to convey or wash materials will generate a tailings stream.

In a mining operation, there may be interest to recover and recycle the water content of the tailings stream. Alternatively, in an industrial mineral processing operation, water may be recycled to the processing operation such as milling, refining, smelting, and other manufacturing processes. Refining operations, for example, include extraction of oil, nickel or copper from the mined material.

Precious metals include gold, silver, platinum, palladium, ruthenium, rhodium, osmium, iridium. Gold, silver, platinum, and palladium are the most commonly mined precious metals. Base metals include nickel, copper, aluminum, lead, zinc, tin, tungsten, molybdenum, tantalum, cobalt, cadmium, titanium, zirconium, antimony, manganese, beryllium, chromium, germanium, vanadium, gallium, hafnium, indium, niobium, rhenium and thallium. Nickel, copper, aluminum, lead, and zinc are the most commonly mined base metals. Gemstones include diamond, emeralds (beryl), rubies, garnet, jade, opal, peridot, sapphire, topaz, turquoise, and others.

Other mining and mineral processing operations include oil sands mining and bitumen extraction and recovery processes.

The tailings stream may be a tailings pond, ore or ore mining process waters, chemically thickened tailings, fresh tailings, MFT, consolidated composite tailings (CCT), or a combination thereof. CCT may be referred to as composite tailings (CT) and non-segregating tailings (NST). Tailings streams useful in the present invention are also described in U.S. patent application Ser. No. 13/329,375.

Polyacrylamide

The process of this disclosure optionally uses a polyacrylamide.

Polyacrylamides (PAMs) useful in the present invention include anionic, cationic, non-ionic and amphoteric polyacrylamides. Polyacrylamides are polymers formed by polymerization of acrylamide, $CH_2=CHC(O)NH_2$. Polyacrylamides of the present invention typically have a molecular weight greater than one million. Polyacrylamides can be linear or branched molecules.

Preferably the PAM is an anionic polyacrylamide (APAM) or cationic polyacrylamide (CPAM). APAM and CPAM are the generic names for a group of very high molecular weight macromolecules produced by the free-radical polymerization of acrylamide and an anionically or a cationically charged co-monomer. APAM and CPAM can be prepared by techniques known to those skilled in the art, including but not limited to the Mannich reaction. Both the charge density (ionicity) and the molecular weight can be varied in APAM and CPAM. By varying the acrylamide/ionic monomer ratio, a charge density from 0 (nonionic) to 100% along the polymer chain can be obtained. The molecular weight is determined by the type and concentration of the reaction initiator and the reaction parameters.

Typically, a polyacrylamide is dissolved in a solvent before contacting with the tailings stream or the mixture. Preferably, the solvent comprises, consists essentially of, or consists of water in this disclosure.

In some embodiments of this invention, polyacrylamide is added to the tailings stream or the mixture to facilitate early water release. The polyacrylamide may be added prior to or after the silicate source addition. For example, the silicate source addition can occur in or before a polyacrylamide thickener or after discharge from the polyacrylamide thickener. The silicate source can also be added prior to, in or after a centrifuge operation that also uses polyacrylamide. In-line injection of polyacrylamide and the silicate source are also possible.

Trafficable Deposit

Trafficable deposit is a solid or semi-solid material that is deposited on or over a surface. The trafficable deposit in this disclosure has a minimum undrained shear strength (yield stress) of 5 kPa one year after deposition, and/or a minimum undrained shear strength of 10 kPa five years after deposition.

Silicate Source

Silicate source of this disclosure comprises, consists essentially of, or consists of an alkali metal silicate; a polysilicate microgel; a partially or fully deionized silicate solution having a molar ratio of Si:M of at least 2.6, wherein M is an alkali metal; colloidal silica; or combinations thereof. In some embodiments of this invention, the silicate source comprises, consists essentially of, or consists of an alkali metal silicate.

An alkali metal silicate can be dissolved in a solvent to make an alkali metal silicate solution before contacting with the tailings stream. Preferably, the solvent comprises, consists essentially of, or consists of water in this disclosure.

Polysilicate Microgel

Polysilicate microgels are aqueous solutions which are formed by the partial gelation of an alkali metal silicate or a polysilicate, such as sodium polysilicate. The microgels, which can be referred to as "active" silica, in contrast to commercial colloidal silica, comprise solutions of from 1 to 2 nm diameter linked silica particles which typically have a surface area of at least about 750 $m^2/g$. Polysilicate microgels are commercially available from E. I. du Pont de Nemours and Company, Wilmington, Del.

Polysilicate microgels have $SiO_2:Na_2O$ mole ratios of 4:1 to about 25:1, and are discussed on pages 174-176 and 225-234 of "The Chemistry of Silica" by Ralph K. Iler, published by John Wiley and Sons, N.Y., 1979. General methods for preparing polysilicate microgels are described in U.S. Pat. No. 4,954,220, the teachings of which are incorporated herein by reference.

Polysilicate microgels include microgels that have been modified by the incorporation of alumina into their structure. Such alumina-modified polysilicate microgels are referred as polyaluminosilicate microgels and are readily produced by a modification of the basic method for polysilicate microgels. General methods for preparing polyaluminosilicate microgels are described in U.S. Pat. No. 4,927,498, the teachings of which are incorporated herein by reference.

Polysilicic acid is a form of a polysilicate microgel and generally refers to those silicic acids that have been formed and partially polymerized in the pH range 1-4 and comprise silica particles generally smaller than 4 nm diameter, which thereafter polymerize into chains and three-dimensional networks. Polysilicic acid can be prepared, for example, in accordance with the methods disclosed in U.S. Pat. No. 5,127,994, incorporated herein by reference.

In addition to the above-described polysilicate microgels, the term "polysilicate microgels" as used herein, includes silica sols having a low S value, such as an S value of less than 50%. "Low S-value silica sols" are described in European patents EP 491879 and EP 502089. EP 491879 describes a silica sol having an S value in the range of 8 to 45% wherein the silica particles have a specific surface area of 750 to 1000 $m^2/g$, which have been surface modified with 2 to 25% alumina. EP 502089 describes a silica sol having a molar ratio of $SiO_2$ to $M_2O$, wherein M is an alkali metal ion and/or an ammonium ion of 6:1 to 12:1 and containing silica particles having a specific surface area of 700 to 1200 $m^2/g$.

Deionized Silicate Solution

A deionized silicate solution may be prepared by means known in the art, for example, by an electrolytic process and/or by use of an ion exchange resin. Ion exchange methods are disclosed, for example, by Bird, in U.S. Pat. No. 2,244,325. The deionized silicate solution may be prepared by contacting a solution of alkali metal silicate with a strong cation exchange resin. The deionized silicate solution may alternatively be prepared by contacting a solution of alkali metal silicate with a weak ion exchange resin.

Iler, in U.S. Pat. No. 3,668,088, discloses a process to remove sodium anions from sodium silicate in an electrodialysis process wherein sodium silicate aqueous solution is electrolyzed while separated from an acid anolyte by a cation-permeable, anion-impermeable membrane.

A deionized silicate solution may be prepared by removing alkali metal from a solution of alkali metal silicate using bipolar electrolysis.

Other processes to prepare deionized silicate solutions include processes which rely on a combination of electrolysis and ion exchange membranes or ion-permeable membranes have been disclosed, for example, in JP2003236345A, JP2004323326A, JP07000803A, JP2002220220A, JP2003311130A and JP2002079527A.

More specifically, a sodium silicate (or water glass) solution may be contacted with a strong cation exchange resin. Strong cation exchange resins have sulfonic acid functionality, R—$SO_3H$, wherein R is the backbone of the resin or the matrix. The resin or matrix can be, for example, functionalized styrene divinylbenzene copolymers. Strong cation exchange resins are commercially available, for example, from Dow Chemical Company.

The deionized silicate solutions may be modified by alumina before or during or after the deionization process. Processes such as those disclosed in U.S. Pat. Nos. 5,482,693; 5,470,435; 5,543,014; and 5,626,721 can be used. Care must be taken when the process uses sodium aluminate so that the added sodium does not provide a Si:Na molar ratio less than 2.6 after such treatment.

The deionized silicate solution may be stabilized by methods known in the art, such as by control of pH or temperature.

A deionized silicate solution is an aqueous (water-based) solution. The solution has a molar ratio of Si:M of at least 2.6. M is an alkali metal, such as lithium, sodium, potassium, or combinations thereof. Preferably the molar ratio is 4 or greater, more preferably 5 or greater. The upper limit of Si:M molar ratio may be set by practical considerations, for example capacity of an ion exchange resin for a given quantity of silicate solution, or alternatively, a minimum threshold for sodium in a particular tailings treatment system, in particular when recovered water is recycled for re-use.

The concentration of silica in the solution after deionization is 1-15% by weight, as "$SiO_2$", preferably 2-10%, more preferably 4-7%.

The deionized silicate solution may comprise particles, anions, and oligomers of silica. The silica specific surface area is greater than 500 $m^2/g$, typically greater than 750 $m^2/g$.

Colloidal Silica

In some embodiments of this invention, the silicate source is selected from the group consisting of colloidal silica, aluminum-modified colloidal silica, de-ionized colloidal silica, and combinations thereof.

Pre-Determined Period of Time

The present disclosure provides a process wherein the silicate source and the activator are added into or contacted with the tailings stream not at the same time. Instead, the activator addition is delayed by a pre-determined period of time. As a result, the gel formation is delayed. The viscosity increase rate and the rate of increase in yield stress of the treated tailings stream are also substantially reduced compared with a non-delayed process when other conditions of the processes are substantially the same.

In this disclosure, the pre-determined period of time is greater than zero. In some embodiments of this invention, the pre-determined period of time is at least 1 minute. In some embodiments of this invention, the pre-determined period of time is at least 2 minutes. In some embodiments, the pre-determined period of time is at least 5 minutes. In some embodiments, the pre-determined period of time is at least 10 minutes. In some embodiments, the pre-determined period of time is at least 15 minutes. In some embodiments of this invention, the pre-determined period of time is at least 20 minutes. In some embodiments of this invention, the pre-determined period of time is at least 25 minutes. In some embodiments of this invention, the pre-determined period of time is at least 30 minutes.

The maximum amount of the pre-determined period of time which has been found to be useful in the present disclosure is about 1440 minutes (24 hours). Typically, pre-determined period of time longer than 1440 minutes are impractical for commercial use. That is not to say that longer times cannot be used in the present disclosure. In some embodiments of this invention, the pre-determined period of time is no more than 1440 minutes. In some embodiments of this invention, the pre-determined period of time is from 1 minute to 1440 minutes. In some embodiments of this invention, the pre-determined period of time is from 2 minutes to 1440 minutes. One skilled in the art would appreciate the newly added variable of delayed gelation of treated tailings and can customize the desired gelation times based on the solids concentrations of the tailings stream to be treated, the silicate sources and concentration, and the activators and concentrations selected.

Activators

Activators useful in the present disclosure comprise any compound or mixture of compounds that can initiate gelation of an alkali metal silicate. In some embodiments of this invention, the activator is selected from the group consisting of acids, alkaline earth metal salts, aluminum salts, organic esters, dialdehydes, organic carbonates, organic phosphates, amides, carbon dioxide, sodium aluminate, and combinations thereof.

Examples of acids useful as activators include, but not limited to, sulfuric acid, phosphoric acid, sodium phosphate, sodium bicarbonate, hydrochloric acid, sodium hydrogen sulfate, and acetic acid. Examples of alkaline earth metal salts and aluminum salts include, but not limited to, calcium chloride, calcium oxide, calcium carbonate, calcium sulfate, magnesium sulfate, magnesium chloride, and aluminum sulfate. Examples of organic esters, dialdehydes, organic carbonates, organic phosphates, and amides include, but not limited to, acetic esters of glycerol, glyoxal, ethylene carbonate, propylene carbonate, and formamide. Preferably, the activator is an acid, an alkaline earth metal salt, carbon dioxide, or combinations thereof. Preferred acids are sulfuric acid. Preferred alkaline earth metal salts are calcium sulfate and calcium chloride. One or more activators may be used.

Reinforcing Agent

The process of this disclosure optionally uses a reinforcing agent.

Reinforcing agents are compounds that act as fillers and mechanically strengthen the treated tailings stream. Reinforcing agents can be used in an amount up to about 70 weight percent of the total weight of the trafficable deposit.

Reinforcing agents are selected from the group consisting of fine gravel, sand from mining operations, waste rock from mining operations; petroleum coke, coal particles; elemental crystalline sulfur; inorganic fibers; organic fibers, and combinations of two or more thereof. Particle size definitions for gravel is determined by ASTM D2488 (2009) "Standard Practice for Description and Identification of Soils (Visual-Manual Procedure)," DOI: 10.1520/D2488-09A, available from ASTM International, West Conshohocken, Pa. Inorganic fibers can be, for example, steel fibers or fiberglass. Organic fibers can be, for example, pulp waste, paper waste, wood waste, and waste paper.

In addition, the surface of the reinforcing agent may be untreated or the surface may have been treated with a surface-active agent. A typical surface-active agent is an organic silane. Surface-active agents strengthen interfacial bonds between the reinforcing agent and the treated tailings.

Treatment of Tailings Stream

In some embodiments of this invention, the tailings stream is mature fine tailings. In some embodiments of this invention, the tailings stream is fresh tailings. In some embodiments of this invention, the tailings stream is chemically thickened, mechanically thickened, or both, forming a partially dewatered tailings stream, prior to step (a). In some embodiments of this invention, the chemically thickening is by flocculation. In some embodiments of this invention, the mechanically thickening is by centrifuge. In some embodiments of this invention, a tailings stream is treated with a flocculant prior to centrifuge.

The contacting steps (a) and (b) can be performed in various ways. The tailings stream, silicate source, and activator with optional reinforcing agent and optional polyacrylamide may be contacted in a vessel and deposited on a surface and allowed to dry. The tailings stream may be first treated by a flocculant and then centrifuged prior to contacting with a silicate source, activator, optional reinforcing agent, and optional polyacrylamide to enhance separation.

In some embodiments, the silicate source, activator, and optional polyacrylamide and/or reinforcing agent are contacted with the tailings stream in a transfer pipeline to initiate gelation, whereas substantial gel matrix formation occurs outside the pipeline to avoid plugging of the pipeline.

Unexpectedly, the viscosity of the tailings stream can be reduced after the tailings stream is contacted with the silicate source in step (a), or after the tailings stream is contacted with the silicate source and the activator and before gel is substantially formed. Lowered viscosity will result in reduced pressure drop in a transfer pipeline and thus facilitate the tailings stream transportation in a pipeline.

In this disclosure, "gel" and "gel matrix" are used interchangeably.

It is noted herein that in contrast to flocculation, in which suspended particles coalesce to form a precipitate, in the process of this disclosure, upon contact with the silicate source and activator, the tailings stream becomes viscous, and then develops rigidity as it strengthens and solidifies in the form of a gel.

It was found by experiments that by delaying the addition of the activator to the tailings stream/silicate source mixture, the time for the gel to be formed is increased. This increase in time prior to gelation allows for transportation of the treated tailings, as well as for deposition purposes. The delaying of the gel formation allows for deposition of the treated tailings onto a sloped surface, where the treated tailings flows for longer distances prior to gelling, compared to treated tailings using a non-delayed process.

In some embodiments of this invention, the tailings treatment process further comprises spreading the gel on and/or over a surface prior to step (c). In some embodiments, such surface is a sloped surface. The difference between "on" or "over" a surface may be a matter of degree, but is meant herein to indicate the gel is deposited on a surface in a particular location, whereas depositing over a surface involves spreading or flowing of the gel. There may be many instances of partial spreading or flow that is best described as a combination of depositing on a surface and depositing over a surface.

In some embodiments of this invention, the tailings treatment process further comprises spreading the gel over a surface prior to step (c). In some embodiments of this invention, such surface is sloped or in a dewatering pit.

In some embodiments of this invention, the gel matrix is spread on a surface prior to step (c) and allowed to de-water and dry.

In some embodiments of this invention, the combined mixture of tailings stream, silicate source, activator, and optional polyacrylamide and/or reinforcing agent is deposited by pumping or spraying, on a surface. As will be appreciated by those skilled in the art, it is important to pump, spray or transfer the combined mixture in a time before the gel strengthens and solidifies to avoid forming a solid that may plug a pump, a spray nozzle or transfer line.

In some embodiments of this invention, the silicate source, activator, and optional polyacrylamide and/or reinforcing agent are added directly to a tailings pond. When added to a tailings pond, water is allowed to evaporate or is separated by other means to dewater the tailings.

In step (c) of allowing the gel to strengthen and solidify, the gel may be dewatered and/or dried.

In some embodiments of this invention, solid-entrapped gel formed from the tailings treatment process may be deposited on a surface, preferably a sloped surface, and allowed to solidify. This step of applying the product of the contacting step to a surface may be repeated numerous times, producing a lift of several layers of solid surface that encompass the solids including the fines of the tailings stream. The process of the present disclosure allows for formation of larger sloped surface deposition by allowing the treated tailings to flow over longer lengths before strengthening and/or solidifying to form a trafficable deposit. Longer sloped surfaces can be desirable for placement into drying pits and subsequent water loss.

In some embodiments of this invention, solid-entrapped gel formed from the tailings treatment process may be deposited into a dewatering pit in one or more layers. When deposited in more than one layer, the weight of multiple layers produces a compression effect which then presses water out of the multiple layer deposits. Sand or porous media may be inserted beneath or on top of a layer to enhance dewatering and drying.

By "strengthen and solidify", it is meant herein that the gel has formed a solid mass, which separates from the water present in the tailings stream. In some embodiments of this invention, the solid mass will develop a minimum undrained shear strength of 5 kPa one year after deposition, and a minimum undrained shear strength of 10 kPa five years after deposition. In the step of allowing the gel to strengthen and solidify, the gel may be dewatered and/or dried. In some embodiments of this invention, the gel is allowed to strengthen and solidify to produce a trafficable deposit.

As used herein, separation of water includes partial separation of water from the gel. Separation may occur or be performed by means such as evaporation, drainage, mechanical dewatering, run-off, compression, exudation, percolation of water to underlying surface, freeze/thaw, sublimation, syneresis. It should be understood that the gel may retain a portion of the total amount of water from the tailings stream and the treatment solutions (e.g., solutions of alkali metal silicates or activators) as all traces would be nearly impossible to remove and water from natural precipitation or run-off from higher elevation of material may become part of the gel.

In some embodiments of this invention, the tailings treatment process further comprises dewatering the gel in step (c). In some embodiments of this invention, the dewatering occurs by air drying (evaporation), water run-off, compression, syneresis, exudation, freeze/thaw, sublimation, or any combination thereof. In some embodiments, the dewatering occurs by evaporation. In some embodiments, the dewatering occurs by water run-off. In some embodiments, the water run-off is recovered and recycled.

By "run-off" it is meant that water is exuded from the gel-entrapped solids, or alternatively water from natural precipitation (rain, snow) that passes over the gel-entrapped solids and runs off the tailings. Run-off is generally captured in a water collection area (e.g., a pond). If water run-off occurs, one may recover the water from this process and recycle the run-off water. For compression, the solids can be deposited into a dewatering pit, where one or more sides allow water run-off to be recovered. For example, the water run-off or recovered water can be re-used in the bitumen extraction.

The gel comprising entrapped solids may undergo "forced drying" using plate-and-frame filter press, or other mechanical dewatering means. Following a forced drying step the dried product may then be spread on a surface, preferably a sloped surface or deposited in a dewatering pit.

In some embodiments of this invention, the gel matrix is allowed to strengthen and solidify, e.g., with dewatering and/or drying, to produce a trafficable deposit.

Trafficable Deposit

In some embodiments of this invention, a trafficable deposit is produced by a process comprising: (a) contacting a tailings stream with a silicate source for a pre-determined period of time to form a mixture; b) after the pre-determined period of time, contacting the mixture with an activator to initiate gel formation, wherein the gel entraps the solids within the gel, and c) allowing the gel to strengthen and solidify by dewatering the gel to form a trafficable deposit; wherein the tailings stream comprises water, solids, and optionally polyacrylamide, and the gel formation is delayed compared with a non-delayed process.

In some embodiments of this invention, the trafficable deposit produced above has a minimum undrained shear strength of 5 kPa. In some embodiments of this invention, the trafficable deposit produced above has a minimum undrained shear strength of 10 kPa.

The trafficable deposit comprises the product of the tailings treatment process. Optionally, the trafficable deposit further comprises a reinforcing agent added prior to strengthening and solidifying.

Typically the trafficable deposit comprises less than 60% water, or less than 50% water, or less than 40% water, on a weight basis, based on total weight of the trafficable deposit. Preferably at least some of the water from the tailings is recovered and recycled into mining and/or mineral processing operations.

Many aspects and embodiments have been described above and are merely exemplary and not limiting. After reading this specification, skilled artisans appreciate that other aspects and embodiments are possible without departing from the scope of the invention.

EXAMPLES

The concepts described herein will be further described in the following examples, which do not limit the scope of the invention described in the claims.

Materials and Test Methods

Mature fine tailings used in the following examples were obtained from an oil sands processor in Alberta, Canada. The mature fine tailings were determined to have >90 volume % particle size smaller than 0.05 mm and a peak yield stress <10 Pa.

Yield stress measurements of the samples were obtained by using a Brookfield rheometer equipped with a vane spindle using Brookfield Rheocalc software and results are reported in Pa (pascals). Yield stress is a measurement defined as the minimum stress needed to cause a Bingham plastic to flow. A higher yield stress indicates greater resistance to flow.

Examples 1 and 2

Examples 1 and 2 demonstrate how development of yield strength can be delayed in thickened tailings by premixing the thickened tailings with sodium silicate solution prior to addition of the acid activator.

Sodium silicate solution (4.56 g, 3.2 ratio) was contacted with thickened tailings (500 g, 48% solids). Activator (2.5N sulfuric acid) was added to the thickened tailings/silicate mixture after a pre-determined period of time (5 min and 15 min for Examples 1 and 2 respectively). The amount of the activator added was sufficient to lower the pH to 7.0. Peak yield stress was measured using a Brookfield DV III rheometer equipped with a vane spindle after 15 min, 30 min, 60 min, 120 min, 1140 min, and 2280 min. Yield stress (Pa) are listed in Table 1.

Comparative Example A

Sodium silicate solution (4.56 g, 3.2 ratio) was contacted with thickened tailings (500 g, 48% solids). Activator (2.5N sulfuric acid) was immediately added to the thickened tailings/silicate mixture. The amount of the activator added was sufficient to lower the pH to 7.0. Peak yield stress was measured using a Brookfield DV III rheometer equipped with a vane spindle after 15 min, 30 min, 60 min, 120 min, 1140 min, and 2280 min after addition of the activator. Yield stress (Pa) are listed in Table 1.

TABLE 1

Delayed yield stress for thickened tailings.

| Example | Pre-determined period of time | Yield Stress (Pa) | | | | | |
|---|---|---|---|---|---|---|---|
| | | 15 min | 30 min | 1 hr | 2 hr | 1 day | 2 days | 15 days |
| 1 | 5 min | | 285 | 455 | 656 | 936 | 932 | 964 |
| 2 | 15 min | | 143 | 229 | 444 | 772 | 796 | 816 |
| A | 0 min | 58 | 548 | 712 | 1016 | 1124 | 1224 | 1180 |

Results show that by delaying the addition of the activator, as in Examples 1 and 2, yield stress development rate is delayed compared to Comparative Example A.

Examples 3 and 4

Examples 3 and 4 demonstrate how development of yield strength can be delayed in mature fine tailings by premixing the mature fine tailings with sodium silicate solution prior to addition of the acid activator.

Sodium silicate solution (6.14 g, 3.2 ratio) was contacted with mature fine tailings (500 g, 28.5% solids). Activator (2.5N sulfuric acid) was added to the thickened tailings/silicate mixture after a pre-determined period of time (15 min and 60 min). The amount of the activator added was sufficient to lower the pH to 7.0. Peak yield stress was measured using a Brookfield DV III rheometer equipped with a vane spindle after 30 min, 100 min, 120 min, 1140 min, and 2280 min after addition of the activator. Yield stress (Pa) are listed in Table 2.

Comparative Example B

Sodium silicate solution (6.14 g, 3.2 ratio) was contacted with mature fine tailings (500 g, 28.5% solids). Activator (2.5N sulfuric acid) was immediately added to the thickened tailings/silicate mixture. The amount of the activator added was sufficient to lower the pH to 7.0. Peak yield stress was measured using a Brookfield DV III rheometer equipped with a vane spindle after 30 min, 100 min, 120 min, 1140 min, and 2280 min after addition of the activator. Yield stress (Pa) are listed in Table 2.

TABLE 2

Delayed yield stress for mature fine tailings.

| Example | Pre-determined period of time | Yield Stress (Pa) | | | | |
|---|---|---|---|---|---|---|
| | | 30 min | 100 min | 2 hr | 24 hr | 48 hr |
| 3 | 15 min | 1.11 | 12.48 | 17.48 | 291.2 | 361.6 |
| 4 | 60 min | 2.21 | 7.50 | 11.96 | 328.0 | 387.2 |
| B | 0 min | 93.7 | 182.4 | 260.8 | 547.2 | 566.4 |

Results show that by delaying the addition of the activator, as in Examples 3 and 4, yield stress development rate is delayed compared to Comparative Example B.

Example 5

Example 5 demonstrates how the benefits of using the process of the present invention can lengthen the travel of the treated tailings compared to known treatment processes where the activator is added immediately after contacting the tailings stream with a silicate source.

Sodium silicate solution (feed rate of 1.83 cc/min, 3.2 ratio) was contacted with mature fine tailings (feed rate of 180 cc/min, 33% solids) in a ¼" ID pipeline reactor. After 5 minutes, an activator (carbon dioxide gas) was added to the mixture to bring the pH to 7.0. The mixture and carbon dioxide remained in the pipeline for a total of 3 minutes of residence time prior to discharge onto a 22" wide×14' long stainless steel pan angled at a 1.5% slope. The distance the treated mature fine tailings progressed down the slope was recorded every 15 minutes for a total of 75 minutes. Results are listed in Table 3.

Comparative Example C

Sodium silicate solution (feed rate of 1.83 cc/min, 3.2 ratio) was contacted with mature fine tailings (feed rate of 180 cc/min, 33% solids) in a ¼" ID pipeline reactor. An activator (carbon dioxide gas) was immediately added to the mixture to bring the pH to 7.0 (ten seconds between contacting of silicate source to the mature fine tailings and addition of carbon dioxide). The mixture and carbon dioxide remained in the pipeline for a total of 3 minutes of residence time prior to discharge onto a 22" wide×14' long stainless steel pan angled at a 1.5% slope. The distance the treated mature fine tailings progressed down the slope was recorded every 15 minutes for a total of 75 minutes. Results are listed in

TABLE 3

| Example | pre-determined period of time | Maximum Distance Travel (feet) | | | | |
|---|---|---|---|---|---|---|
| | | After 15 min | After 30 min | After 45 min | After 60 min | After 75 min |
| 5 | 5 min | 6.1' | 8' | 8' | 9.8' | 11.8' |
| C | 10 sec | 3.1' | 4.1' | 5.1' | 5.1' | 5.1' |

Results show that by delaying the addition of the activator, as in Example 5, can lengthen the travel distance by almost double the distance as opposed to Comparative Example C where the activator is added immediately after the silicate source.

The following example and comparative examples illustrate an added benefit of viscosity reduction of untreated tailings by the addition of only a silicate solution. This reduction of viscosity results in reduced pressure drop in pipelines. This is particularly useful in tailings stream having high solids content such as centrifuged tailings, thickened tailings, etc.

Example 6

Example 6 demonstrates how the addition of the sodium silicate alone reduces the viscosity of the tailing stream.

Sodium silicate solution (11.11 grams of 3.2 ratio, 41° Be) was added to mature fine tailings (1000 grams, 36.7 wt % solids). This mixture was stirred at 800 rpm for 1 minute. The viscosity was measured to be 124 cps on a Brookfield HB rheometer equipped with a #72 vane spindle rotating at 250 rpm utilizing Brookfield Rheocalc software.

Comparative Example D

The viscosity of untreated mature fine tailings (1000 grams, 36.7 wt % solids) The viscosity was measured to be 142 cps on a Brookfield HB rheometer equipped with a #72 vane spindle rotating at 250 rpm utilizing Brookfield Rheocalc software.

Comparative Example E

To demonstrate that the reduction in viscosity is not simply from dilution of the mature fine tailings, water (11.11 g) was added to mature fine tailings (1000 grams, 36.7 wt % solids) and mixed. This mixture was stirred at 800 rpm for 1 minute. Viscosity of this mixture was found to be 138 cps, or essentially equivalent to the untreated mature fine tailings.

Example 7

Example 7 demonstrates trafficable deposits that have a yield stress greater than 5 kPa which were prepared by the process of the claimed invention.

Sodium silicate solution (22.2 g of 3.2 ratio, 41° Be) were added to mature fine tailings (2000 g, 36.7 wt % solids) and mixed for five minutes. After the five minutes, sulfuric acid (2.5 N) was added to lower the pH to 7 and initiate gelation. The sample was covered to prevent evaporation and held for 72 hours. The initial yield stress, after 72 hours was determined to be 920 Pa. A representative sample of the treated tailings (500 g) was then removed and placed in an open beaker and exposed to the atmosphere to allow for evaporative drying. After an additional eight days, the solid concentration was determined to be 88.2 wt % and the yield stress was found to be greater than 40 kPa.

Example 8

Example 8 demonstrates trafficable deposits that have a yield stress greater than 5 kPa which were prepared by the process of the claimed invention. In Example 8, the treated tailings were physically dewatered by a piston press to increase the solids %.

Sodium silicate solution (22.2 g of 3.2 ratio, 41° Be) were added to mature fine tailings (2000 g, 36.7 wt % solids) and mixed for five minutes. After the five minutes, sulfuric acid (2.5 N) was added to lower the pH to 7 and initiate gelation. The sample was covered to prevent evaporation and held for 72 hours. The initial yield stress, after 72 hours was determined to be 920 Pa. After 72 hours, a representative sample of the treated tailings (1104.5 g) was placed into a 4" diameter stainless steel tube equipped with a screened end supporting a filter paper. A piston was inserted into the other end of the tube and a load of 10 kPa was applied to the treated tailings for 24 hours, followed by a load of 50 kPa for an additional 112 hours. The yield stress was determined to be 15.3 kPA for the dewatered treated tailings (loss of 355.4 g of water).

Examples 7 and 8 demonstrate that the trafficable deposit prepared by the present invention will demonstrate yield stress of over 5 kPa once the deposit is allowed to strengthen, solidify, and dewater.

Example 9

This example demonstrates how the invention can be used to delay the onset of gelation in anionic polyacrylamide thickened tailings.

Thickened tailings were obtained from a mineral sands mine. X-ray diffraction analysis of the tailings indicated the major mineral constituents were 35 wt % $SiO_2$ and 55 wt % kaolinite clay. Particle size distribution as determined by light scattering indicated a D50 particle size of 6.98 microns. The tailings were previously treated at the mine site in a thickener by addition of 250 grams of high molecular weight anionic polyacrylamide per 1000 kg of tailings mineral solids so as to achieve a thickened tailings solids concentration of 22.6 wt %.

1000 grams of thickened tailings (Sample A) were treated by addition of 13.6 grams of 3.2 ratio sodium silicate solution containing approximately 28.5 wt % $SiO_2$. This silicate dose resulted in a 1/200 $SiO_2$/tailings water ratio. Five minutes after addition of the sodium silicate solution enough sulfuric acid was added to reduce the tailings pH to 6.0. Peak yield stress development rate of the treated tailings sample was determined using a Brookfield rheometer equipped with a vaned spindle. The rheometer was interfaced to a PC running Brookfield's rheocalc software.

As a comparison, a second tailings sample (B) was treated following the above procedure, but the acid was added immediately after addition of the silicate.

| Sample | Pre-determined period of time | Yield Stress (Pa) at time after acid addition | | | | | |
|---|---|---|---|---|---|---|---|
| | | 30 minutes | 1 hour | 2 hours | 24 hours | 48 hours | 4 days | 7 days |
| A | 5 minutes | 105 | 114 | 157 | 317 | 374 | | 381 |
| B | none | 138 | 149 | 200 | 444 | | 426 | |

Example 10

This example demonstrates how the invention can be used to delay onset of gelation in mature fine tailings (MFT) that has been treated with anionic polyacrylamide.

MFT was obtained from an oil sands mine. X-ray diffraction analysis of the MFT indicated the major mineral constituents were 50 wt % $SiO_2$, 30 wt % kaolinite clay, and 15 wt % potassium aluminosilicate clays (illite and muscovite). Particle size distribution as determined by light scattering indicated a D50 particle size of 10.8 microns. The MFT was treated with 1 gram of branched, high molecular weight anionic polyacrylamide per 1000 grams of MFT dry solids. The resulting tailings had a solids concentration of 28.6 wt %.

500 grams of MFT (Sample A) was treated by addition of 2.98 grams of 3.2 ratio sodium silicate solution containing approximately 28.5 wt % $SiO_2$. This silicate dose resulted in a 1/420 $SiO_2$/tailings water ratio. Twenty five minutes after addition of the sodium silicate solution enough sulfuric acid was added to reduce the tailings pH to 6.8. Peak yield stress development rate of the treated sample was determined using a Brookfield rheometer equipped with a vaned spindle. The rheometer was interfaced to a PC running Brookfield's rheocalc software.

As a comparison, a second sample (B) was treated following the above procedure, but the acid was added immediately after addition of the silicate.

| Sample | Pre-determined period of time | Yield Stress (Pa) at time after acid addition | | | | |
|---|---|---|---|---|---|---|
| | | 30 minutes | 1 hour | 2 hours | 24 hours | 7 days |
| A | 5 minutes | 21 | 32 | 47 | 218 | 573 |
| B | none | 41 | 59 | 86 | 321 | 666 |

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination.

What is claimed is:

1. A process for treating a tailings stream comprising water, solids, and optionally polyacrylamide, comprising: (a) contacting the tailings stream with a silicate source to form a mixture; b) after a pre-determined period of time of at least 5 minutes, contacting the mixture with an activator to initiate gel formation, wherein the gel entraps the solids within the gel; and c) allowing the gel to strengthen and solidify.

2. A process according to claim 1, wherein the pre-determined period of time is at least 10 minutes.

3. A process according to claim 1, wherein the predetermined period of time is at least 15 minutes.

4. A process according to claim 1, wherein the silicate source comprises an alkali metal silicate; a polysilicate microgel; a deionized silicate solution having a molar ratio of Si:M of at least 2.6, wherein M is an alkali metal; colloidal silica; or combinations thereof.

5. A process according to claim 1, wherein the activator is selected from the group consisting of acids, alkaline earth metal salts, aluminum salts, organic esters, dialdehydes, organic carbonates, organic phosphates, amides, carbon dioxide, sodium aluminate, and combinations thereof.

6. A process according to claim 1, further comprising spreading the gel over a surface prior to step (c).

7. A process according to claim 6, wherein the surface is a sloped surface.

8. A process according to claim 1, further comprising adding a polyacrylamide to the tailings stream or the mixture prior to step (c).

9. A process according to claim 1, further comprising adding a reinforcing agent to the tailings stream or the mixture prior to step (c).

10. A process according to claim 1, wherein the tailings stream is produced in a process to extract bitumen from oil sands ores.

11. A process according to claim 1, further comprising dewatering the gel in step (c).

12. A process according to claim 11, wherein dewatering occurs by air drying (evaporation), water run-off, compression, syneresis, exudation, freeze/thaw, sublimation, or any combination thereof.

13. A process according to claim 12, wherein dewatering occurs by evaporation.

14. A process according to claim 12, wherein dewatering occurs by water run-off.

15. A process according to claim 12, wherein the water run-off is recovered and recycled.

16. A process according to claim 1, wherein the tailings stream is chemically thickened, mechanically thickened, or both, forming a partially dewatered tailings stream, prior to step a).

17. A process according to claim 16, wherein the chemically thickening is by flocculation.

18. A process according to claim 16, wherein the mechanically thickening is by centrifuge.

* * * * *